(12) United States Patent
Purvines

(10) Patent No.: US 7,762,778 B2
(45) Date of Patent: Jul. 27, 2010

(54) FAN IMPELLER

(75) Inventor: Stephen H. Purvines, Mishiwaka, IN (US)

(73) Assignee: Kurz-Kasch, Inc., Dayton, OH (US)

( * ) Notice: Subject to any disclaimer, the term of this patent is extended or adjusted under 35 U.S.C. 154(b) by 686 days.

(21) Appl. No.: 11/804,292

(22) Filed: May 17, 2007

(65) Prior Publication Data
US 2008/0286130 A1  Nov. 20, 2008

(51) Int. Cl.
*F04D 29/36* (2006.01)
(52) U.S. Cl. .............................. 416/186 R; 416/186 A; 416/219 R; 416/219 A; 416/189
(58) Field of Classification Search ............. 416/186 R, 416/186 A, 189, 219 R, 219 A; 415/206
See application file for complete search history.

(56) References Cited

U.S. PATENT DOCUMENTS 3,144,204 A * 8/1964 Bohanon ................ 416/186 R
3,224,078 A * 12/1965 Mayne ....................... 29/889.4
3,224,079 A * 12/1965 Dybvig ....................... 29/889.4
5,558,499 A * 9/1996 Kobayashi ............... 416/186 R
6,368,062 B1 * 4/2002 Yagami et al. .............. 416/178

* cited by examiner

*Primary Examiner*—Ninh H Nguyen
(74) *Attorney, Agent, or Firm*—Stinson Morrison Hecker LLP

(57) ABSTRACT

A fan impeller having fan blades, a base plate, a support ring and fasteners to releasably hold the fan blades between the base plate and the support ring. The base a plate includes channels each having two or more sockets that receive and releasably seat at least a portion of the fan blade. The position of the fan blade relative the axis of rotation of the impeller can be selected from the two or more sockets. The support ring includes grooves in which at least a portion of the fan blade releasably seats to hold the fan blades static relative the base plate and the support ring. The fasteners can extend between the base plate and the support ring to releasably hold the two or more blades.

26 Claims, 6 Drawing Sheets

FAN IMPELLER

INTRODUCTION

A fan is a device used to induce airflow and generally made from broad, flat surfaces which revolve or oscillate. The most common applications of fans are for ventilation and/or gas transport for industrial purposes.

There are three main types of fans used for moving air, axial, centrifugal (also called radial) and cross flow (also called tangential). The axial-flow fans have blades that force air to move parallel to the shaft about which the blades rotate. Axial fans blow air linearly across the axis of the fan. This is the most commonly used type of fan, and is used in a wide variety of applications, ranging from small cooling fans for electronics to the giant fans used in wind tunnels.

The centrifugal fan has a moving component called an impeller that consists of a central shaft about which a set of blades form a spiral pattern. Centrifugal fans blow air at right angles to the intake of the fan, and spin (centrifugally) the air outwards to the outlet. An impeller rotates, causing air to enter the fan near the shaft and move perpendicularly from the shaft to the opening in the scroll-shaped fan housing. A centrifugal fan produces more pressure for a given air volume, and is used where this is desirable. They are typically noisier than comparable axial fans.

The cross flow fan has a squirrel cage rotor (a rotor with a hollow center and axial fan blades along the periphery). Tangential fans take in air along the periphery of the rotor, and expel it through the outlet in a similar fashion to the centrifugal fan. Cross flow fans give off an even airflow along the entire width of the fan, and are very quiet in operation. They are comparatively bulky, and the air pressure is low.

Fans usually use electrical power. Electric fans generally consist of a set of rotating blades that are placed in a protective housing that permits air to flow through it. The blades are rotated by an electrical motor, for big industrial fans, 3-phase asynchronous motors are commonly used. Smaller fans are often powered by shaded pole AC motors, or brushed or brushless DC motors. AC-powered fans usually use mains voltage, while DC-powered fans use low voltage, typically 24V, 12V or 5V. Cooling fans for computer equipment exclusively use brushless DC motors, which produce much less EMI. In machines which already have a motor, the fan is often connected to this rather than being powered independently. This is commonly seen in cars, large cooling systems and winnowing machines.

BRIEF DESCRIPTION OF THE DRAWINGS

The Figures presented herein provide illustrations of non-limiting example embodiments of the present disclosure. The Figures are not necessarily to scale.

DETAILED DESCRIPTION

Figure 1:
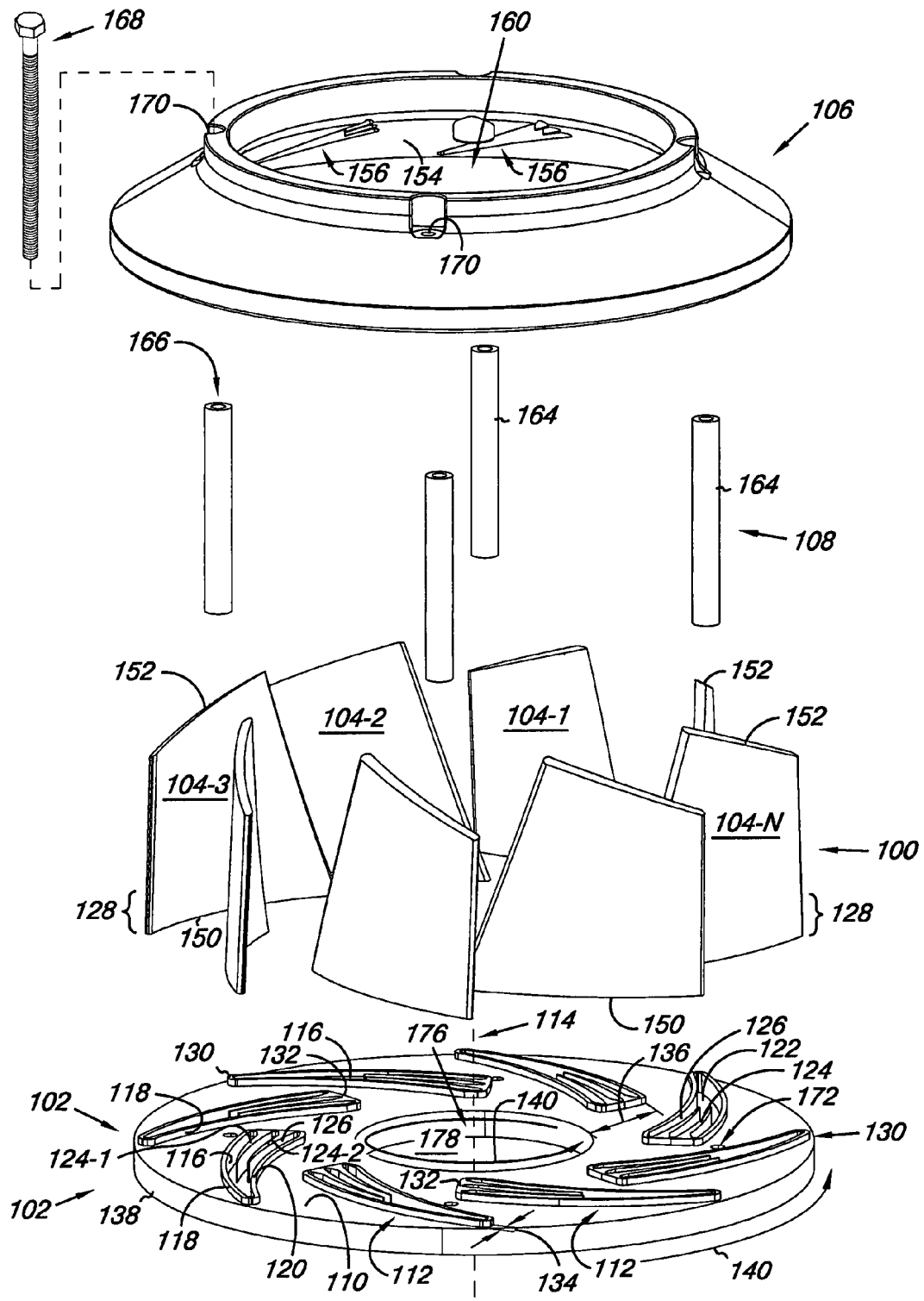
FIG. 1 illustrates an exploded view of one embodiment of an impeller according to the present disclosure.

Embodiments of the present disclosure include impellers, components of impellers, methods of configuring and forming impellers, and fans that include impellers of the present disclosure. As used herein, impellers include, but are not limited to, a rotating device that can be used to move a fluid in a desired direction under a pressure. Fluids can include, but are not limited to, gases and/or liquids. It will be apparent to those skilled in the art that the following description of the various embodiments of this disclosure are provided for illustration only and not for the purpose of limiting the invention as defined by the appended claims and their equivalents.

The Figures herein follow a numbering convention in which the first digit or digits correspond to the drawing figure number and the remaining digits identify an element in the drawing. Similar elements between different figures may be identified by the use of similar digits. For example, 102 may reference element "102" in FIG. 1, and a similar element may be referenced as "202" in FIG. 2. As will be appreciated, elements shown in the various embodiments herein can be added, exchanged, and/or eliminated so as to provide a number of additional embodiments.

In describing the various embodiments herein, the following directional terms "annular," "axial," "circumferential," "radial," "longitudinal" and "transverse" as well as other similar directional terms may be used. As used herein, these directional terms as well as other directional terms are made relative to a center rotational axis of a shaft that can rotate the impeller embodiments of the present disclosure. Accordingly, these terms, as used to describe various embodiments should be interpreted relative to the center rotational axis of the shaft. The shaft may be coupled to the impeller through a central hub of the impeller. Alternatively, the shaft may be part of and extend from the impeller to be coupled to (directly or indirectly), for example, a motor. In addition, the figures presented herein provide illustrations of non-limiting example embodiments.

Embodiments of the present disclosure include, but are not limited to, an impeller that include, among other things, a base plate, a support ring, and a fan blade, where the fan blade can be releasably positioned in a static state between the base plate and the support ring. As used herein, a releasably positioned fan blade, or releasably positioning a fan blade in a static state between the base plate and the support ring includes fixedly positioning the fan blade into one of a number of different positions on the base plate. In order to fixedly position the fan blade in the number of different static states, a base plate is provided with a channel having a partition that helps to define a socket to releasably receive and position an edge of a fan blade. As discussed herein, the base plate can include two or more channels that each include a partition member, or partition members, that help to define two or more sockets. In one embodiment, a fan blade can be releasably positioned into one of the two or more sockets of each of the channels.

Embodiments of the present disclosure include those directed to an impeller. The impeller embodiments of the present disclosure can be useful with axial flow fans which are characterized by flow through the impeller in a direction generally parallel to the shaft axis. The impeller embodiments of the present disclosure are also useful with centrifugal fans that receive airflow into the impeller axially, and redirect the airflow radially outward. The impeller embodiments of the present disclosure can also be useful with mixed flow fans, which are characterized in that the air enters the impeller axially and is deflected at an obtuse angle by the fan blades such that the air flowing out of the impeller has both axial and radial flow components.

In addition, a variety of fan blades are also useful with the present disclosure. Such fan blades include those used in radial blade fans, radial tip fans, airfoil fans, backwardly inclined flat fan, and forward-curved-blade centrifugal fans. Impellers and/or fans of the present disclosure can also be used in a number of different applications including, but not limited to, those that require explosion proof fans, fans used in food handling facilities/applications (e.g. a food grade fan), fans for use in toxic (e.g., biological and/or chemical) environments, and fans for use in flammable environments. Use of the embodiments of the present disclosure is also possible with other types of fans.

According to the present disclosure, the fan blades being releasably positioned can be inserted into a first socket of an individual channel and then held statically in place between the base plate and the support ring of the impeller. If desired, the position of the fan blades can then be changed, or modified, by removing the support ring and repositioning and inserting the fan blades into a second socket (or a different socket than the first socket) of the individual channels in the base plate. Selection of desired socket for inserting the fan blade can be based on the shape and/or configuration of the fan blade selected to be used with the impeller. In addition, the selection of the desired socket can also be based on the rotational speed (rotations per minute) of the impeller.

Once the fan blades are positioned in their respective sockets, the support ring can then be positioned releasably engage the fan blades. In one embodiment, the support ring includes grooves in which at least a part of each fan blade seats to hold the fan blade in a static relationship relative the base plate and the support ring. Fasteners can then be used to releasably secure the fan blades between the base plate and the support ring.

FIG. 1 provides an exploded illustration of one embodiment of an impeller 100 according to the present disclosure. The impeller 100 includes a base plate 102, a fan blade 104, a support ring 106 and fasteners 108 extending between the base plate 102 and the support ring 106. In one embodiment, the components of the impeller 100 are releasably held together with the fasteners 108 so that the fan blades 104 are held static relative the base plate 102 and the support ring 106.

As illustrated, the base plate 102 includes a surface 110 that help to define a channel 112. In one embodiment, the base plate 102 includes two or more channels 112. In an additional embodiment, the number and relative position of the channels 112 defined by the surface 110 can be configured so as to allow the fan blades 104 to be balanced around an axis of rotation 114 of the base plate 102. So, for example, the channels 112 can be symmetrically arranged on the base plate 102 to be balanced opposite each other across the axis of rotation 114. Other configurations are possible.

In an additional embodiment, the channels 112 can be located at the same radial position on the base plate 102 relative the axis of rotation 114. Alternatively, channels 112 can be located at different radial positions on the base plate 102 relative the axis of rotation. For example, a first pair of channels 112 positioned opposite each other across the axis of rotation 114 can have a first radial position on the base plate 102 relative the axis of rotation 114, while a second pair of channels 112 positioned opposite each other across the axis of rotation can have a second radial position that is different from the first radial position. Other combinations of radial positions for the channels 112 are possible.

In one embodiment, the channels 112 include a peripheral side wall 116 that helps to define an outer perimeter 118 of each channel 112. In one embodiment, the peripheral side wall 116 of the channel can extend from an upper surface 120 of the base plate 102 down to a lower surface 122, relative the upper surface 120, of the base plate 102. In an additional embodiment, the peripheral side wall 116 can also extend above the upper surface 120 of the base plate 102, as illustrated in FIG. 1.

The channels 112 further include a partition member 124 that in conjunction with the peripheral side wall 116 helps to define two or more sockets 126 in the channel 112. As illustrated, the channel 112 includes a first partition member 124-1 and a second partition member 124-2 to define three (3) separate sockets 126 in the channel 112. In an additional embodiment, the channel 112 could include other numbers of partition members, including only one and/or greater than two (e.g., three or four partition members).

In one embodiment, each of the sockets 126 in the channel 112 defines an opening having the same approximate dimensions of an end portion 128 of the fan blade 104. For example, each of the sockets 126 has a width, a depth and a side wall profile that allow for the fan blade 104 to make contact with the surface 110 of the base plate 102 and the partition member 124 defining the socket 126. In other words, the socket 126 can be configured to releasably receive and seat at least a portion of the fan blade 104 (e.g., the end portion 128) so as to hold the fan blade 104 in a predetermined position relative the base plate 102. As will be appreciated, contact between the end portion 128 of the fan blade 104 and the socket 126 need not extend around the entire end portion 128 of the fan blade 104.

In one embodiment, the two or more sockets 126 permit an adjustment of an angular position of the fan blades 104 relative the axis of rotation 114 of the impeller 100 base plate 102. So, for example, the angular position of the fan blades 104 can be adjusted or changed depending upon the intended rotational speed of the impeller 100 and/or type and/or shape of the fan blade 104 to be used in the impeller 100.

This flexibility in adjusting the relative position of the fan blades 104 according to the present disclosure allows for adjustments in the performance (e.g., adjustment of fan static pressure and/or flow rate), efficiency (e.g., horse power required for the fan) and/or sound levels produced by the impeller, and the fan, during operation. Having the ability to adjust these components can result in a reduction of the energy needed to operate the fan, thus conserving cost, and can lead to a further reduction in noise pollution associated with operation of the fan.

In one embodiment, the walls defining the sockets 126 (e.g., the partition member 124 and the peripheral side wall 116) can extend orthogonal relative the surface 110 of the base plate 102. In an additional embodiment, the peripheral side walls 116 and/or the partition member 124 can extend orthogonally relative the axis of rotation of the base plate.

Alternatively, the peripheral side wall 116 and/or the partition member 124 can extend from the lower surface 122 of the socket 126 at an obtuse angle relative the lower surface 122 of the socket 126 to provide walls defining the socket 126 having a "V" shaped cross-sectional profile. In one embodiment, this would allow the end portion 128 of the fan blade 104 to wedge into the socket 126 as the fan blade 104 is releasably inserted into the socket 126. Other shapes for the cross-sectional profile of walls defining the socket 126 are also possible, including those having a ridge extending peripherally from the fan blade 104 that releasably engages into a corresponding cavity in the wall(s) defining the socket 126.

In one embodiment, the peripheral side walls 116 further define a first end 130 and a second end 132 of the channel 112. As illustrated, the partition members 124 are located between the first end 130 and the second end 132 of the channel 112 where they help to define the sockets 126. For example, the partition members 124 extend partially through the channel 112 from the second end 132 toward the first end 130 of the channel 112. In one embodiment, the partition member 124 can have a width that is sufficiently large to allow for lateral pressure to be applied to it from the fan blade 104 being inserted without breaking or shearing.

In one embodiment, the sockets 126 of a given channel 112 can each have a similar shape and size (e.g., width, depth, side edge profile). In an alternatively embodiment, the sockets 126 of a given channel 112 could have dissimilar shapes and sizes. In other words, there could be two more sockets 126 having different predetermined shapes and dimensions for each of the channels 112. In one embodiment, this could be useful in accommodating fan blades 104 having different cross-sectional profiles shapes and/or sizes.

As discussed herein, the peripheral side wall 116 extending between the first end 130 and the second end 132 of the channel 112 can define a variety of shapes for the channel 112. In one embodiment, the shape of the channel 112 can be influenced by the shape and size of the fan blades 104 to be used in the impeller 100. For example, as illustrated in FIG. 1, the peripheral side walls 116 can diverge between the first end 130 and the second end 132 where a distance 134 between the peripheral side walls 116 at the first end 130 is less than a distance 136 between the peripheral side walls 116 at the second end 132. This configuration provides for a wedge shape for the channel 112. In this embodiment, the distance 134 at the first end 130 can accommodate the end portion 128 of the fan blade 104 so as to make contact at the peripheral side walls 116 at the first end 130 when the fan blade 104 is placed in any one of the sockets 126 at least partially defined by the partition members 124.

As illustrated, the base plate 102 can further include an outer circumferential surface 138, where the first end 130 of each of the channels 112 is closer to the outer circumferential surface 138 than the second end 132. In other words, the peripheral side walls 116 between the first end 130 and the second end 132 that help to define the channel 112 extend radially from the axis of rotation 114 of the base plate 102 (e.g., toward the center of the base plate 102). As illustrated, the peripheral side walls 116 between the first end 130 and the second end 132 extend along a curved line in a rotational direction 140 of the base plate 102.

Figure 2:
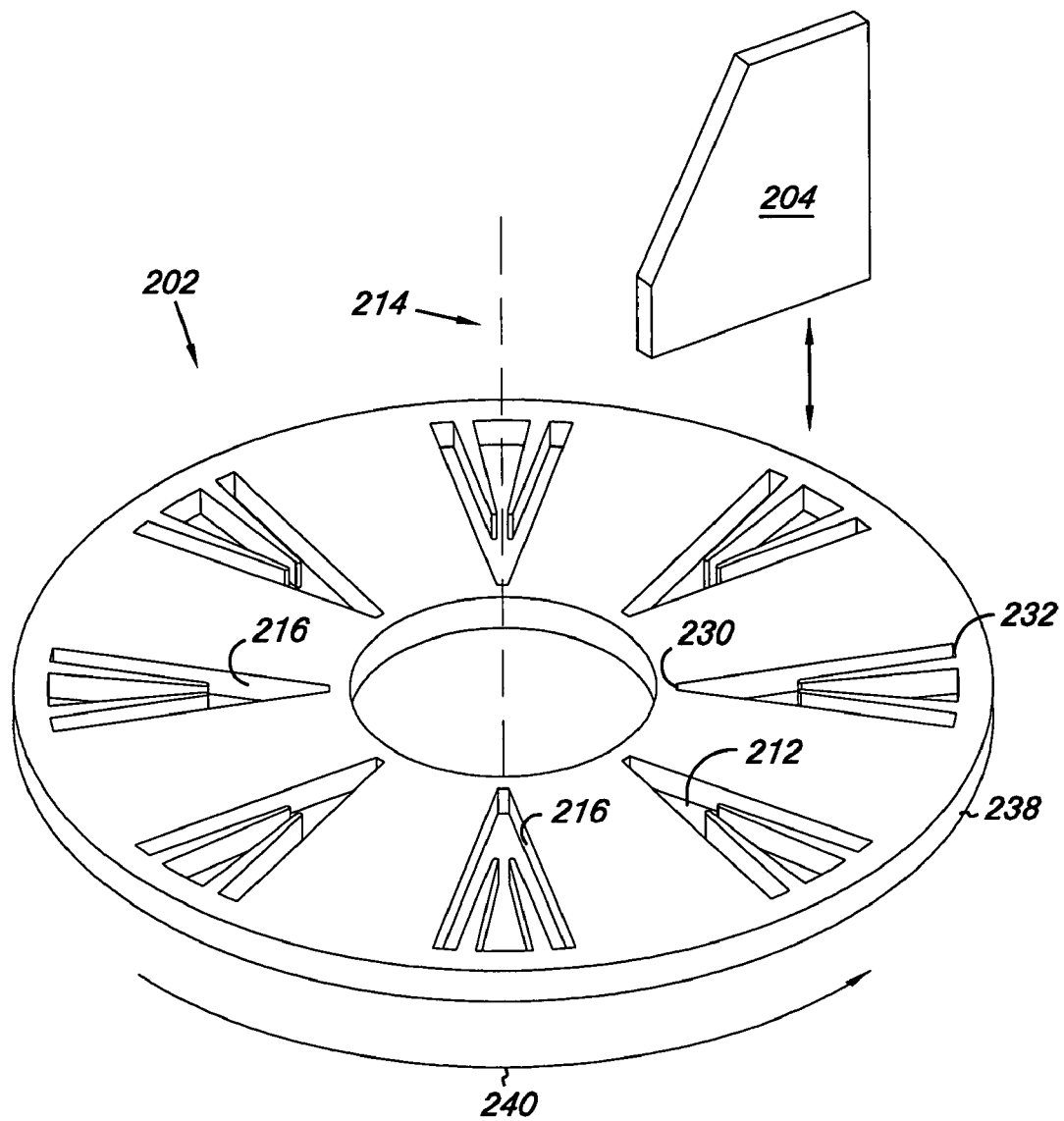
FIG. 2 illustrates one embodiment of a base plate of an impeller according to the present disclosure.

Additional embodiments for the relative position of the channel 112 are also possible. For example, FIG. 2 illustrates an embodiment in which the second end 232 of each of the two or more channels 212 are closer to the outer circumferential surface 238 as compared to the first end 230. In addition, the embodiment of FIG. 2 also illustrates an embodiment in which the peripheral side walls 216 between the first end 230 and the second end 232 extend radially from the axis of rotation 214 of the base plate 202 along a straight line. In the present embodiment, the peripheral side walls also extend perpendicularly with respect to the rotation direction 240 of the base plate 202.

Figure 3:
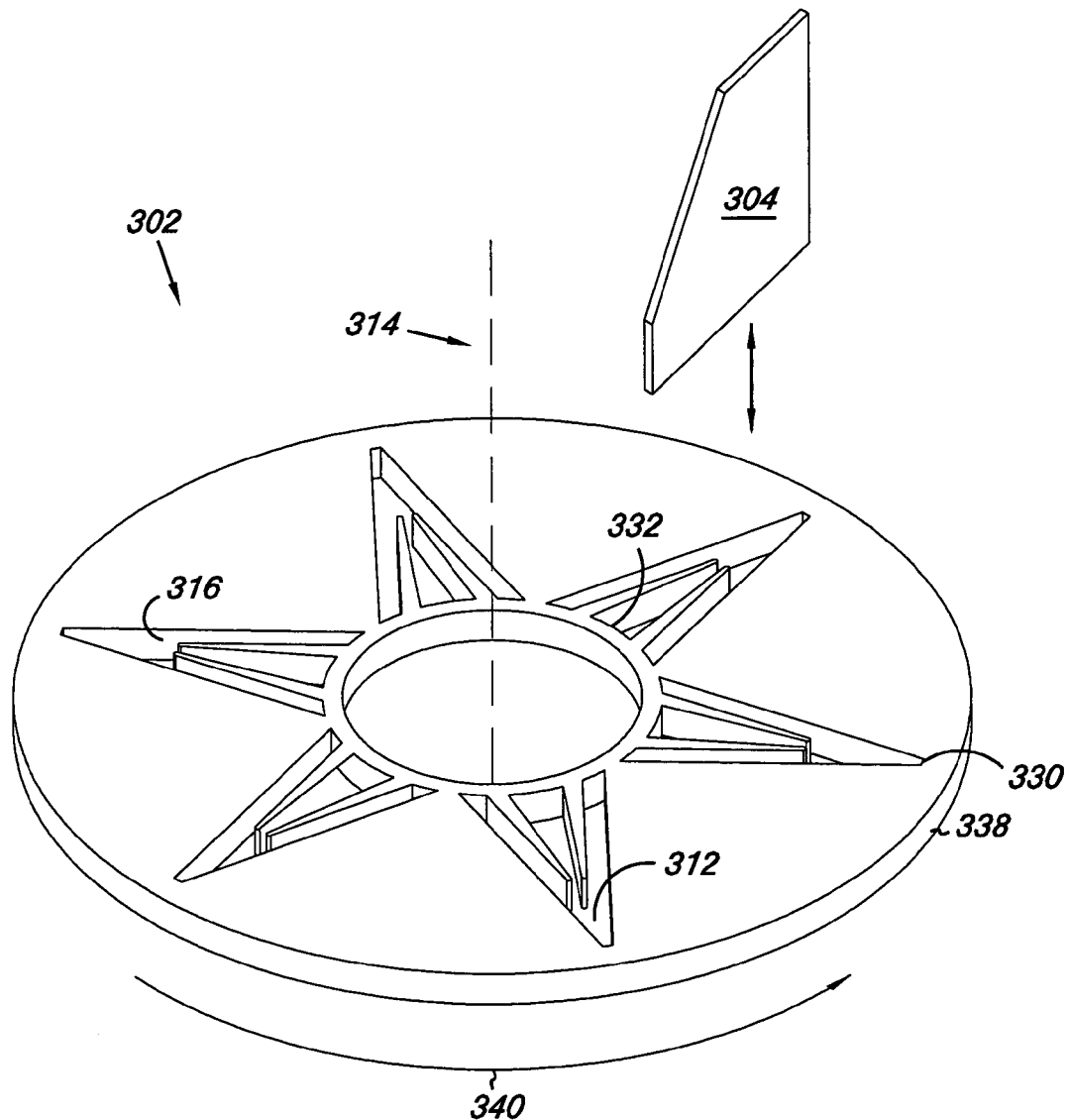
FIG. 3 illustrates one embodiment of a base plate of an impeller according to the present disclosure.

FIG. 3 provides an additional embodiment of a base plate 302 according to the present disclosure. As illustrated, the base plate 302 includes two or more channels 312 in which the first end 330 of each of the two or more channels 312 are closer to the outer circumferential surface 338 as compared to the second end 232. In addition, the embodiment of FIG. 3 also illustrates an embodiment in which the peripheral side walls 316 between the first end 330 and the second end 332 extend radially from the axis of rotation 314 of the base plate 302 along a straight line. In the present embodiment, the peripheral side walls also extend perpendicularly with respect to the rotation direction 340 of the base plate 302.

Referring again to the embodiment illustrated in FIG. 1, each of the fan blades 104 includes a first end 150 and a second end 152 opposite the first end 150. Fan blades 104 can further have a number of different shapes and/or configurations. For example, the fan blade 104 can have a planar configuration. Alternatively, the fan blade 104 can have a non-planar configuration. For example, the fan blade 104 can have a predetermined pitch with respect to the plane of rotation that can vary between the first end 150 and the second end 152.

In addition, the fan blade 104 can have a symmetrical cross-sectional shape. In another embodiment, the fan blade 104 can have an air foil shape that may include variations in the cross-sectional shape and size (e.g., thickness) of the body of the fan blade 104. Other fan blade configurations and designs are possible, where the shape, size and configuration of the channels 112 and sockets 126 are adapted to releasably receive the fan blades as discussed herein.

The impeller 100 also includes the support ring 106 that can be used to releasably hold the fan blades 104. In one embodiment, the support ring 106 includes a surface 154 that help to define grooves 156. The grooves 156 are sized and positioned on the support ring 106 so as to releasably receive at least a portion of the second end 152 of the fan blades 104. The surface 154 of the support ring 106 can further define an air inlet opening 160 for the impeller 100. The air inlet opening 160 allows for air to be drawn into the impeller 100 along the axial direction and then exit from the impeller 100 either circumferentially and/or axially.

As will be appreciated, the grooves 156 of the support ring 106 can be located and configured to accommodate releasably receiving the fan blades 104 that have been placed in any one of the sockets 126 of the two or more channels 112. In addition, the surfaces 154 defining the grooves 156 can have the same approximate dimensions of the portion of the fan blades 104 they are to receive.

As discussed herein, the impeller 100 further includes fasteners 108 that extend between the base plate 102 and the support ring 106 to releasably hold the two or more blades 104. In one embodiment, the fasteners 108 help to hold the two or more blades 104 static relative the base plate 102 and the support ring 106.

In one embodiment, the fasteners 108 can include connector rods 164 having a lumen 166 through which a connector shaft 168 can pass. For example, the connector shaft 168 could be a bolt having a threaded pin or rod with a head at one end. The bolt can be inserted through an opening 170 in the support ring 106, where the threaded rod passes through the opening 170 and the lumen 166 to engage a threaded socket 172 in the base plate 102. Torque can then be applied to the bolts to releasably couple and secure the base plate 102, the fan blades 104 and the support ring 106 of the impeller 100.

In an alternative embodiment, the connector shaft can pass through an opening in the base plate 102, where a threaded nut is used to releasably couple and secure the base plate 102, the fan blades 104 and the support ring 106 of the impeller 100. Alternatively, the connector shaft can be keyed to engage and releasably lock into a corresponding slot in the base plate 102. Other mechanisms and configurations for releasably coupling and securing the base plate 102, the fan blades 104 and the support ring 106 of the impeller 100 are also possible.

In one embodiment, the connector rods 164 can have a predetermined length that is based on size and shape of the fan blades 104 being used in the impeller 100. For example, the predetermined length of the connector rods 164 can be configured to ensure that the fan blades 104 are at least partially and/or completely seated in their respective sockets 126 and grooves 156 when the connector shafts 168 have been tightened into the threaded sockets 172 of the base plate 102.

The impeller 100 can further include a central hub section 176. In one embodiment, the central hub section 176 is an opening 178 defined by the surface 110 of the base plate 102. The surface 110 defining the opening 178 can also include a spline to engage a drive shaft of a motor. Alternatively, the central hub section 176 can include one or more set screws to engage the drive shaft of the motor. Other coupling mechanisms are also possible.

In an alternative embodiment, the base plate 102 can be coupled to or be formed with a shaft that extends from the central hub section 176 along the axis of rotation 114. For example, the base plate 102 could include mountings to receive and couple a drive shaft. In one embodiment, the mountings can be located on the surface 110 of the base plate 102 that is opposite of the channels 112. With these embodiments discussed herein, the shaft can then be coupled to a drive shaft of a motor as discussed.

Figure 4:
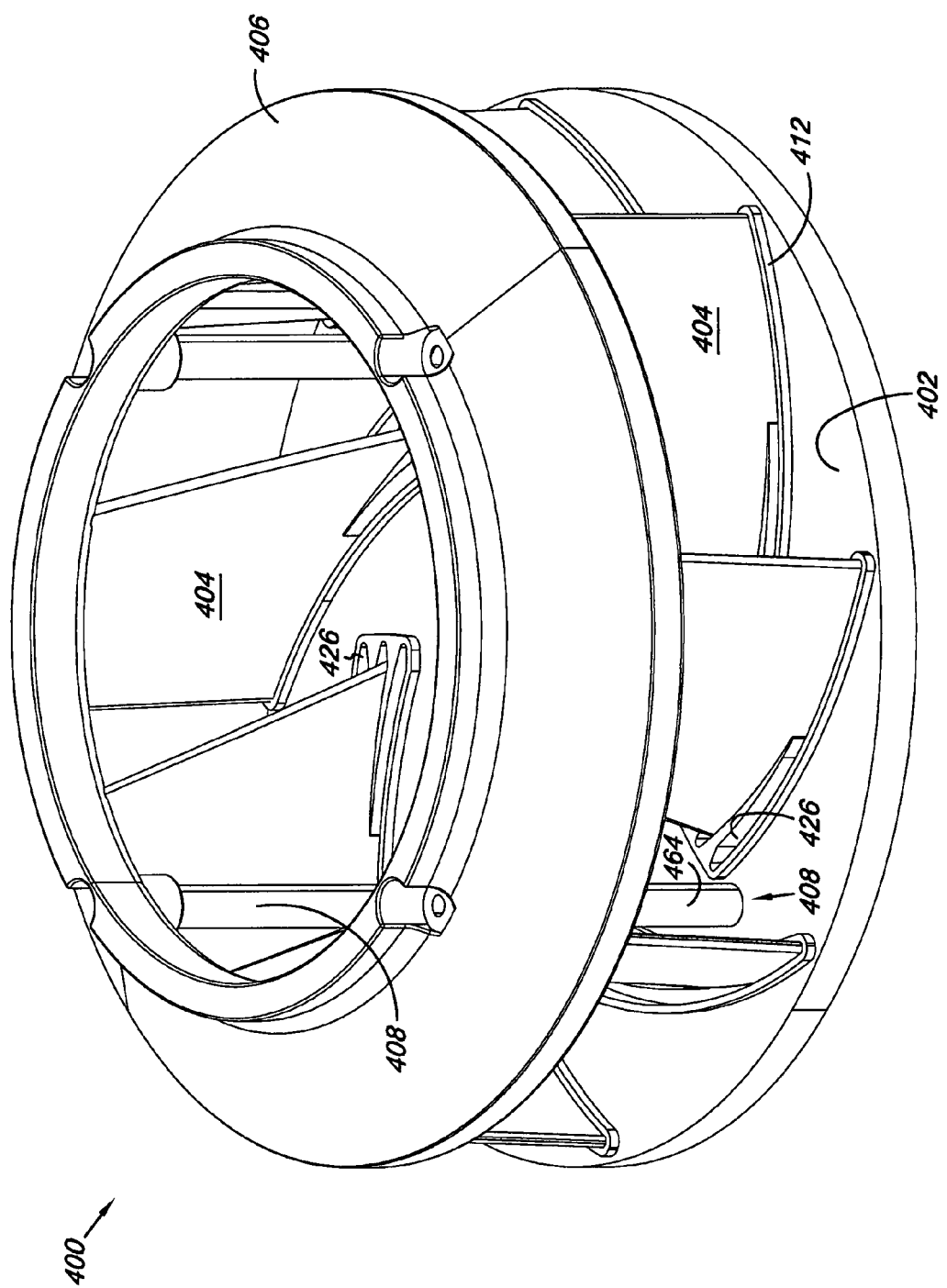
FIG. 4 illustrates one embodiment of an impeller according to the present disclosure.

FIG. 4 provides an illustration of the impeller 400 according to the present disclosure. The impeller 400 is shown coupled together with the fasteners 408, which include connector rods 464. As illustrated the fan blades 404 are releasably seated in one of the three available sockets 426 of each channel 412. In the present embodiment, the fan blades 404 are all positioned in the same relative socket 426 for each channel 412. It is also possible that fan blades 404 in adjacent channels 412 can be seated in different relative sockets 426 as long as impeller 400 remains balanced about the axis of rotation. As discussed herein, if desired the components of the impeller 400 could be disassembled and then reassembled with same fan blades 404 in different (or the same) sockets 426 or using different fan blades 404 in the same or different sockets 426. The selection of fan blade 404 and location in the sockets 426 can depend upon the design and use factors discussed herein.

Figure 5:
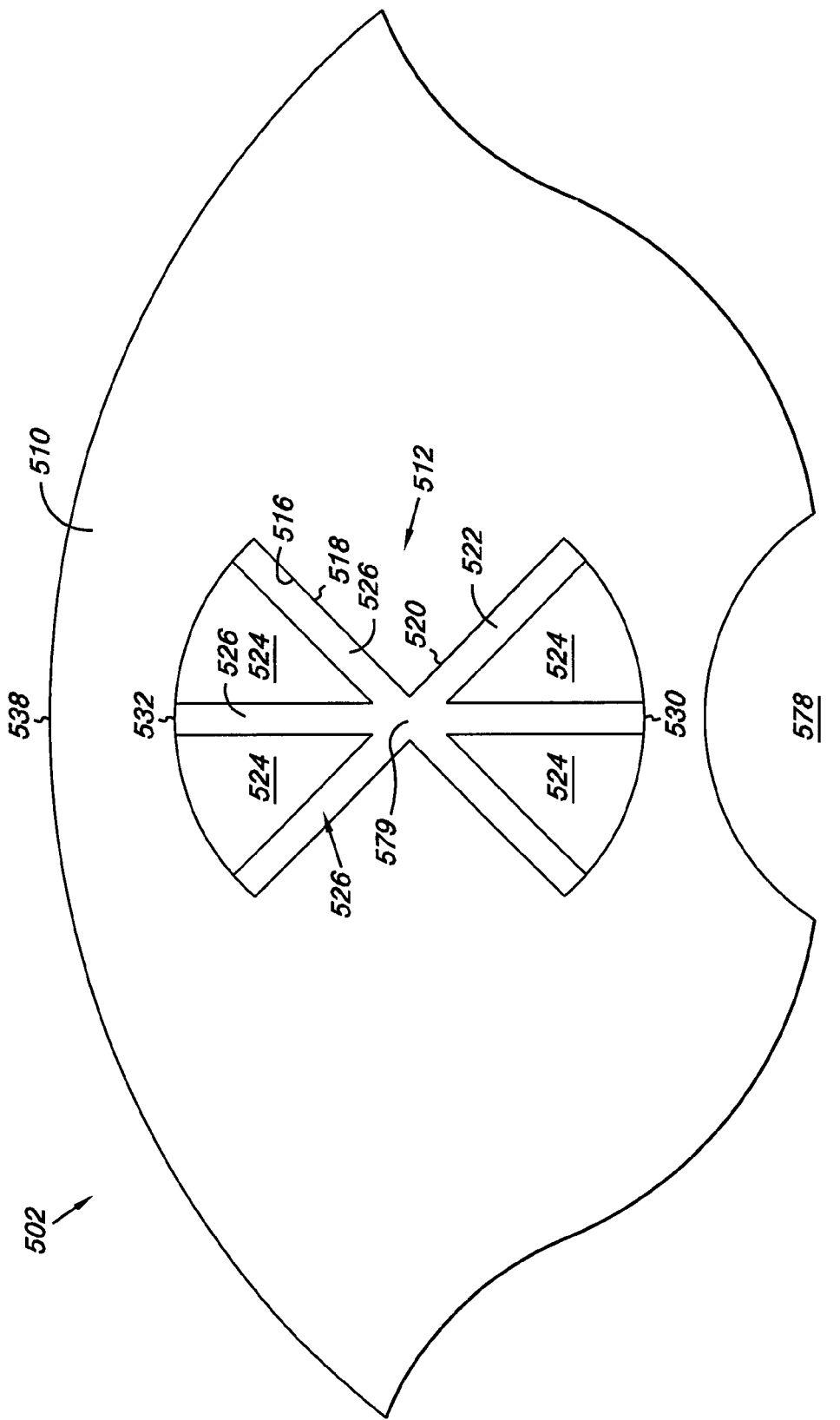
FIG. 5 illustrates a partial view of one embodiment of a base plate having a channel with sockets according to the present disclosure.

As discussed herein, additional embodiments for the base plate having a channel are possible. FIG. 5 provides an additional embodiment of a channel 512 for a base plate 502. As illustrated, the channel 512 includes sockets 526 at least partially defined by the partition members 524 and the peripheral side walls 516. In one embodiment, the sockets 526 allow for a fan blade to be releasably positioned in a forward blade configuration, a neutral blade configuration, and/or a backward blade configuration relative the rotation direction of the base plate 502.

Is illustrated, the partition members 524 extend from both the first end 530 and the second end 532, where the channels 526 share a common intersection 579. In an additional embodiment, the channels 526 can be defined alone by the partition members 524 that extend from the first end 530 toward the second end 532, or by the partition members 524 that extend from the second end 532 toward the first end 530. Other configurations are also possible.

Figure 6:
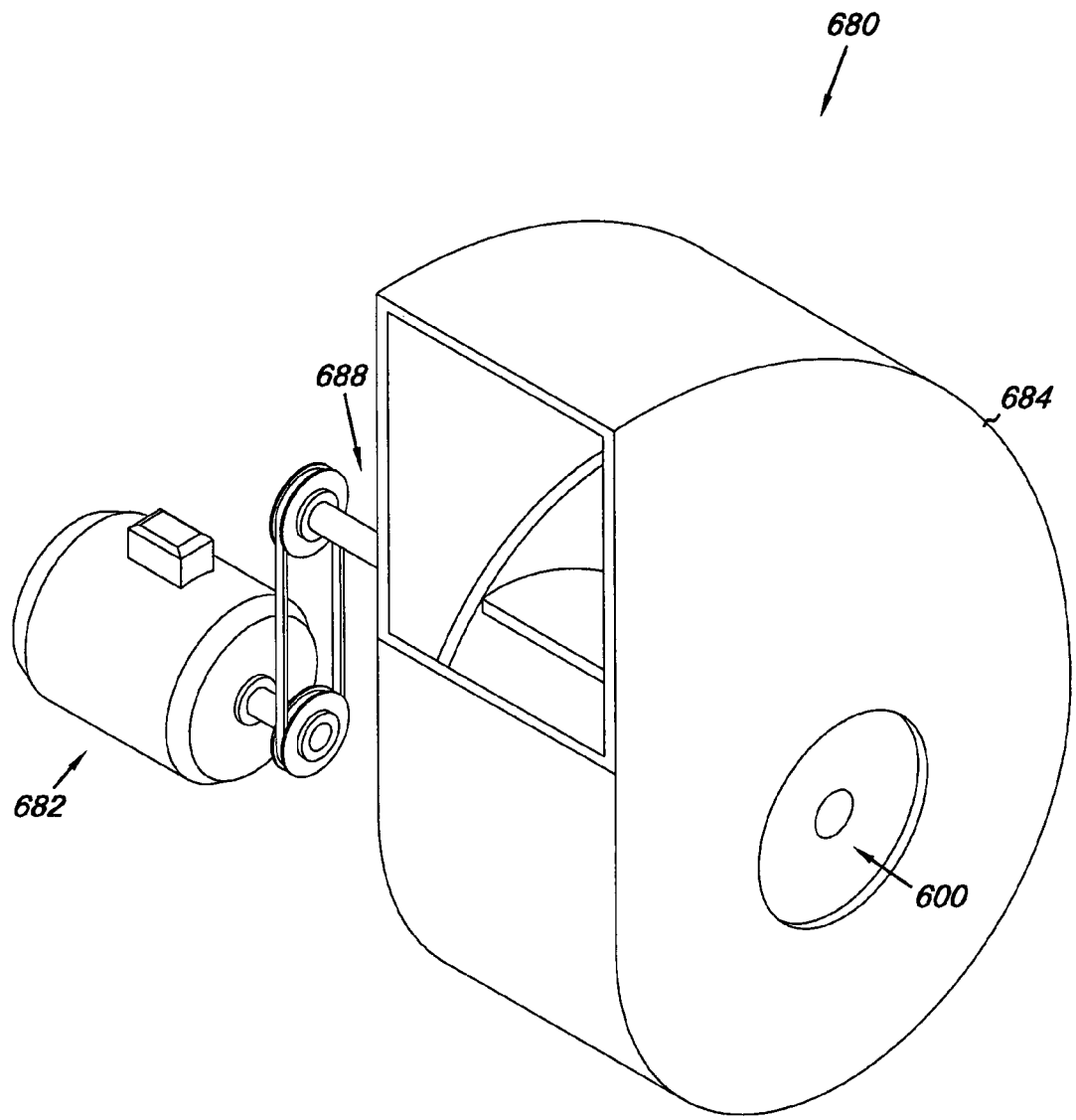
FIG. 6 illustrates one embodiment of a fan having an impeller according to the present disclosure.

FIG. 6 illustrates an embodiment of a fan 680 according to the present disclosure. In the present embodiment, the fan 680 includes a motor 682, the impeller 600, and a housing 684 that surrounds at least a portion of the impeller 600. The housing 684 can further contain air diffuser vanes. Such vanes may be flat or curved in cross-section and may be fixed or pivotally mounted on the housing 648. The fan 680 further include a shaft 688 coupled to the motor 682 and the impeller 600, where the shaft 688 rotates to move the impeller 600. The embodiment illustrated in FIG. 6 is an indirect drive system. As will be appreciated, a direct drive system is also possible.

As discussed herein, the impeller 600 of the present disclosure can be used with a number of different types of fans for different purposes. Such fans include centrifugal fans having radial blade fans, forward-curved-blade fan, radial tip fans, airfoil fans, backwardly inclined flat fans, among others. As discussed herein, embodiments of the impeller of the present disclosure can be used with these types of fans, among others.

Methods and processes for forming the impeller and various components of the impeller described herein are provided as non-limiting examples of the present disclosure. As will be appreciated, a variety of molding processes exist that can be used to form the components of the impeller. Examples of such molding processes can include resin transfer molding, compression molding, transfer molding, and injection molding, among others.

Other fabrication processes are possible to form the components of the impeller. For example, components of the impeller could be cast, milled, molded, stamped, and/or cut. In addition, the components of the impeller of the present disclosure can be formed from a number of different materials. For example, the components could be formed from metal, metal alloys, and polymers, including thermoplastics and/or thermoset materials.

Methods of the present disclosure include those of forming the various components and features of the impeller of the present disclosure. For example, the base plate can be formed using a fabrication technique discussed herein to have a channel with two or more sockets. As discussed, each of the two or more sockets of each channel can be positioned at a predetermined angle relative an axis of rotation of the base plate. In addition, the peripheral side walls of the channel can be formed with the first end and the second end with a distance between the peripheral side walls at the first end being less than a distance between the peripheral side walls at the second end. A hub can also be formed in the base plate for engaging a drive shaft of a motor.

In a similar fashion, the support ring having grooves positioned to receive the fan blade when inserted into any one of the two or more sockets in the base plate could be formed by similar or different fabrication techniques. Finally, the fan blades to be inserted into one of the two or more sockets of the base plate and a groove of the support ring could be formed. Selection of the fabrication technique for proving the components of the impeller will be dependent upon, for example, the type of materials used to form the components and the shape, configuration and application of the resulting components. Fasteners, as discussed herein, can then be provided to allow the fan blades to be releasably held in a static state relative the base plate and the support ring, as discussed herein.

While the present disclosure has been shown and described in detail above, it will be clear to the person skilled in the art that changes and modifications may be made without departing from the spirit and scope of the disclosure. As such, that which is set forth in the foregoing description and accompanying drawings is offered by way of illustration only and not as a limitation. The actual scope of the disclosure is intended to be defined by the following claims, along with the full range of equivalents to which such claims are entitled. In addition, one of ordinary skill in the art will appreciate upon reading and understanding this disclosure that other variations of the embodiments of the disclosure described herein can be included within the scope of the present disclosure.

What is claimed:

1. A fan comprising:
    a motor;
    a shaft that rotates, the shaft coupled to the motor;
    an impeller coupled to the shaft, the impeller having:
        two or more fan blades each having a first end and a second end opposite the first end;
        a base plate having a surface defining two or more channels, each channel having a partition member that help to define two or more sockets, where the first end of a fan blade seats in one of the two or more sockets; and
        a support ring having a surface defining grooves in which at least a portion of the second end of each fan blade of the two or more fan blades seats to hold the two or more fan blades static relative the base plate and the support ring; and
    a housing that surrounds at least a portion of the impeller.

2. The fan of claim 1, where the surface of the base plate defining the two or more channels includes peripheral side walls, each channel having a first end and a second end with a distance between the peripheral side walls at the first end being less than a distance between the peripheral side walls at the second end.

3. The fan of claim 2, where the base plate includes an outer circumferential surface, where the first end of each of the two or more channels is closer to the outer circumferential surface than the second end.

4. The fan of claim 2, where the base plate includes an outer circumferential surface with the second end of each of the two or more channels being closer to the outer circumferential surface than the first end.

5. The fan of claim 2, where the peripheral side walls between the first end and the second end extend along a straight line.

6. The fan of claim 2, where the peripheral side walls between the first end and the second end extend along a curved line.

7. The fan of claim 2, where the peripheral side walls between the first end and the second extend radially from an axis of rotation of the base plate.

8. The fan of claim 7, where the peripheral side walls extend perpendicularly with respect to a rotation direction of the base plate.

9. The fan of claim 7, where the peripheral side walls extend in a rotation direction of the base plate.

10. The fan of claim 2, where the partition member that helps to define two or more sockets in a channel extends partially through the channel from the second end toward the first end of the channel.

11. The fan of claim 2, where the fan blade contacts the peripheral side walls at the first end of the channel and the partition member defining at least a portion of the socket.

12. The fan of claim 1, where the fan blade releasably seats in one of the two or more sockets and a groove of the impeller.

13. The fan of claim 1, where the impeller includes fasteners that extend between the base plate and the support ring to releasably hold the two or more blades.

14. The fan of claim 1, where the two or more sockets permit an adjustment of an angular position relative an axis of rotation of each of the two or more blades of the impeller.

15. An impeller for a fan, comprising:
    fan blades each having a first end and a second end opposite the first end;
    a base plate having a surface defining channels each having a partition member that help to define two or more sockets in a channel to releasably receive at least a portion of the first end of a fan blade, where the two or more sockets permit an adjustment of an angular position of each of the fan blades relative an axis of rotation of the base plate;
    a support ring having a surface defining grooves to releasably receive at least a portion of the second end of the fan blades; and
    fasteners that extend between the base plate and the support ring to releasably hold the two or more blades static relative the base plate and the support ring.

16. The impeller of claim 15, where the channel includes peripheral side walls that define a first end and a second end of the channel, where the peripheral side walls diverge between the first end and the second end.

17. The impeller of claim 16, including a second partition member in each channel to define three sockets in the channel, where each of the three sockets provide a predetermined angular position for each of the fan blades relative the axis of rotation of the base plate.

18. The impeller of claim 16, where the peripheral side walls are orthogonal relative the axis of rotation of the base plate.

19. The impeller of claim 15, where the fasteners include connector rods having a lumen through which a threaded shaft passes, the base plate having a threaded socket to engage the threaded shaft and where the surface of the support ring further defines openings through which the threaded shaft passes to releasably couple the based plate and the two or more blades.

20. The impeller of claim 15, where the base plate includes a hub having a spline to engage a drive shaft of a motor.

21. A method of forming an impeller, comprising:
    forming a channel having two or more sockets in a base plate;
    forming a support ring having grooves; and
    providing a fan blade to be inserted into one of the two or more sockets of the base plate and a groove of the support ring.

22. The method of claim 21, including providing fasteners to releasably hold the fan blade in a static state relative the base plate and the support ring.

23. The method of claim 21, where forming the channel includes positioning the two or more sockets each at a predetermined angle relative an axis of rotation of the base plate.

24. The method of claim 21, where forming the channel includes forming peripheral side walls to define the channel having a first end and a second end with a distance between the peripheral side walls at the first end being less than a distance between the peripheral side walls at the second end.

25. The method of claim 21, where forming the support ring having grooves includes positioning the grooves in the support ring to receive the fan blade when inserted into any one of the two or more sockets in the base plate.

26. The method of claim 21, including forming a hub in the base plate for engaging a drive shaft of a motor.

* * * * *